MULTIPLE D.-C. REPEATER

Filed June 9, 1959 2 Sheets-Sheet 1

ROBERT J. GILMAN,
EVERETT A. GILBERT
INVENTORS

BY Rudolph J. Juick
ATTORNEY

Sept. 26, 1961 R. J. GILMAN ET AL 3,002,053

MULTIPLE D.-C. REPEATER

Filed June 9, 1959 2 Sheets-Sheet 2

ROBERT J. GILMAN,
EVERETT A. GILBERT
INVENTORS

BY Rudolph J. Jusick
ATTORNEY

United States Patent Office 3,002,053
Patented Sept. 26, 1961

3,002,053

MULTIPLE D.-C. REPEATER

Robert J. Gilman, Wayne, and Everett A. Gilbert, Denville, N.J., assignors to Radio Frequency Laboratories, Inc., Boonton, N.J., a corporation of New Jersey Filed June 9, 1959, Ser. No. 819,064
10 Claims. (Cl. 178—73)

This invention relates to a telegraph system and more particularly to a multiple D.-C. repeater for local and through operation of D.-C. teletype circuits.

The multiple D.-C. repeater of our invention is used to combine one local and a plurality of remote telegraph signals on a junction basis with break-in facilities. It will be understood, that in teleprinter systems in which our multiple D.-C. repeater may be employed, the various characters, figures, punctuation marks, etc., are represented by a succession of wave pulses having a precise time duration, all in accordance with a telegraph code. The time duration of each wave pulse and the spacing therebetween are of the order of milliseconds, and it is common practice to designate one current pulse as a Mark signal and the other a Space signal. The signals are generated by telegraph transmitters and transmitted over any desired communication link, such as, telephone lines, microwave links, power line carrier systems, or the like to receiving printers. The coded Mark and Space signals are distinguished at the receiver printer, such that, generally, only the Mark signals are effective to cause operation of the printer selector magnet mechanism and bring about the power operation of the type bar corresponding to the particular received code.

Any one of a various number of methods for designating the Mark and Space conditions may be used in teleprinter systems. In amplitude modulation methods, such as on-off keying systems, the transmitter normally sends a current of fixed value and sign to the line during a Mark period and zero current during a Space period (although these conditions may be reversed, if desired). In frequency shift systems, a carrier is shifted to a frequency above its center-band frequency for a Mark function and to a frequency below center for a Space function. In on-off keying systems, care must be exercised in adjustment of the receiver sensitivity since line noise must not produce a receiver output. That is to say, the signal to noise level at the receiver input must be sufficient for the receiver to distinguish therebetween. In the frequency shift method, two tones are transmitted; one during the Mark or "on" time, and one during the Space or "off" time, and since voltages are transmitted at all times the noise must become equal to, or larger than, the signals before printer errors occur. It will be apparent, then, that the frequency shift method of tone signaling is superior to the on-off method. Regardless of the system employed in transmitting the signals over a communication link, the receiver ouput and transmitter input circuits operate on a D.-C. basis; that is, a Mark and Space signals thereat are represented by different levels of D.-C. potential. It will be understood that the operating circuits of the novel multiple D.-C. repeater of our invention are of the D.-C. type; the said repeater being designed for local and through operation of D.-C. teletype circuits.

A great number of applications exist for a multiple D.-C. repeater and it will be understood that our invention is not limited to any particular application thereof. In one application, for example, a plurality of remote telegraph stations and a local station may be connected through the novel D.-C. repeater as a junction, the system operating on a half-duplex basis but still retaining break-in features. In the practical repeater circuitry, up to four remote telegraph signals may be connected thereto, although theoretically no such limit exists. In the practical arrangement, therefore, more remote stations may be added to the one junction by the use of two or more repeaters cascaded with suitable amplifiers. Similarly, a number of multiple D.-C. repeaters may be connected remotely through suitable tone channels when the telegraph system demands more than one junction (such application being illustrated in the block diagram of FIGURE 1 of the drawings and described in detail hereinbelow).

The repeater may be used, or easily modified for use, in existing systems with tone channels that have a relay or voltage output, and whose transmitters can be voltage keyed. In a further application, the multiple D.-C. repeater can be connected as a junction between teleprinters alone with the use of suitable output amplifiers, such use thereof eliminating the need for stringing the teleprinters in series, to thereby eliminate the inherent drawbacks of such series operation of printers.

An object of this invention is the provision of a multiple D.-C. repeater for use as a junction between a plurality of sources of remote telegraph signals and a local telegraph signal source.

An object of this invention is the provision of a repeater for use in combining one local and a plurality of remote telegraph signals on a junction basis with break-in facilities.

An object of this invention is the provision of a completely electronic multiple D.-C. repeater which eliminates the need for relays commonly used in repeater circuitry, thereby avoiding the maintenance problems usually encountered with high speed mechanical devices.

An object of this invention is the provision of a telegraph system having an electronic multiple D.-C. repeater which includes a plurality of "or" circuits each comprising a plurality of diodes, the diodes of the individual "or" circuits providing an output to the individual telegraph stations, each telegraph station providing an input to each of the said "or" circuits except one whereby the output from the "or" circuits are fed to each of the said stations except the station supplying the input to the said repeater.

An object of this invention is the provision of an electronic multiple D.-C. repeater for use as a junction between a plurality of sources of D.-C. telegraph signals and comprising a plurality of diode networks equal to the number of signal sources, each diode network including a plurality of diodes the number of which in each network includes one less than the total number of signal sources, a plurality of gas tubes connecting the signal sources to the diode networks, each signal source being connected to individual diodes in all except one of the networks and in a manner whereby a different combination of signal sources provide inputs to each diode network.

These and other objects and advantages will become apparent from the following description when taken with the accompanying drawings illustrating our invention. It will be understood, however, that the drawings are for purposes of illustration and are not to be construed as defining the scope or limits of the invention, reference being had for the latter purposes to the appended claims.

In the drawings wherein like reference characters denote like parts in the several views.

Figure 1:
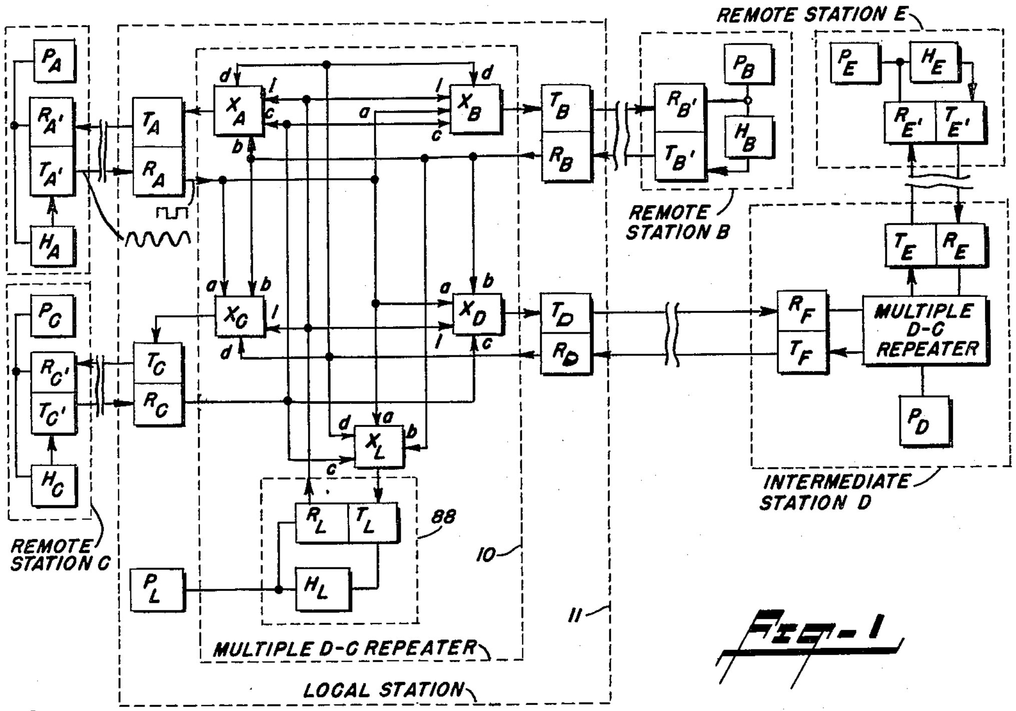
FIGURE 1 is a block diagram of a telegraph system employing two of the novel multiple D.-C. repeaters of our invention, one repeater being shown in detailed block diagram form.

Reference is first made to FIGURE 1 of the drawings wherein a plurality of remote telegraph stations A, B and C are shown connected to the multiple D.-C. repeater, designated 10, of our invention, which repeater is incorporated in a local station 11. A remote station E is shown connected through an intermediate station D to the local station 11; the said intermediate station including also a multiple D.-C. repeater. The repeater at the intermediate station is provided with only two remote channels and a local channel whereas the local station repeater 10 includes four remote channels and a local channel. Except for the number of remote channel inputs, the said repeaters may be of identical construction.

The remote stations A, B, C and E may be of identical construction, each comprising, for example, a transmitter, receiver, D.-C. hybrid circuit, and a teleprinter designated by the letters T, R, H and P, respectively; the said reference characters including sub-letters and primes for purposes of individual identification and reference. Further, the transmitters and receivers $T_A$—$T_F$ and $R_A$—$R_F$, respectively, at the local and intermediate stations may be of identical design and associated receivers and transmitters in the communication links. It will here be pointed out, however, that the local transmitter $T_L$, receiver $R_L$, and D.-C. hybrid circuit $H_L$ within the multiple repeater 10 (and also those in the repeater at the intermediate station D) operate entirely upon a D.-C. basis and are, therefore, of different design from those utilized in the remainder of the system.

The remote station transmitters and receivers, and associated channel receivers and transmitters at the local and intermediate stations are preferably of the audio frequency shift type; i.e., the transmitters $T_A$—$T_F$ and $T_{A'}$—$T_{E'}$ are preferably of the type wherein a D.-C. pulse input thereto is converted to frequency shift audio signals, and the receivers $R_A$—$R_F$ and $R_{A'}$—$R_{E'}$ are of the type which convert the received audio frequency signals to D.-C. pulses. The lines connecting the above audio frequency shift type receivers and transmitters may include any of the types of transmission circuits capable of providing half-duplex telegraph operation and include, by way of example, telephone lines, microwave links, power line carrier systems, wire lines, and the like. Since such communication links are well known, they are not shown in detail in the drawings.

As mentioned above, the remote stations A, B, C and E each include a D.-C. hybrid circuit and a teleprinter designated $H_A$, $H_B$, $H_C$, $H_E$ and $P_A$, $P_B$, $P_C$, $P_E$, respectively. The teleprinters are of well known conventional construction and comprise a selector magnet and keyboard, the said magnet and key contacts thereof being energized in a series circuit with a suitable source of D.-C. potential. It will be understood that the printer is electronically operated by the output from the associated receiver upon receipt of suitable input signals to such receiver. The remote station transmitters are keyed, through the associated D.-C. hybrid circuit, by voltage pulses from the telegraph loop. At all other times, when the printer keyboard is not being manipulated, the D.-C. hybrid circuits hold the transmitters in a Mark condition.

The D.-C. Mark and Space signals from the receivers $R_A$—$R_D$ and $R_L$, designated *a*—*d* and *l*, respectively, are fed to "or" circuits designated by the blocks $X_A$—$X_D$ and $X_L$. The outputs from the "or" circuits $X_A$—$X_D$ and $X_L$ are connected only to the associated local station transmitters $T_A$—$T_D$ and $T_L$, respectively. It will be noted, however, that the D.-C. pulse signal inputs from the receivers $R_A$—$R_D$ and $R_L$ are connected to every block X except that one associated with its transmitter $T_A$—$T_D$ and $T_L$, respectively. For example, it will be noted that the output "*a*" from the receiver $R_A$ is fed to "or" circuits $X_B$, $X_C$, $X_D$ and $X_L$, but not to the circuit $X_A$. Each of the blocks $X_A$—$X_D$ and $X_L$ are identical circuits such that, if the D.-C. inputs *a, b, c, d* and *l* are in a Mark condition, the output is a D.-C. Mark signal, and if any one of the inputs *a, b, c, d* and *l* is a Space signal, the output therefrom is a Space signal.

Figure 2:
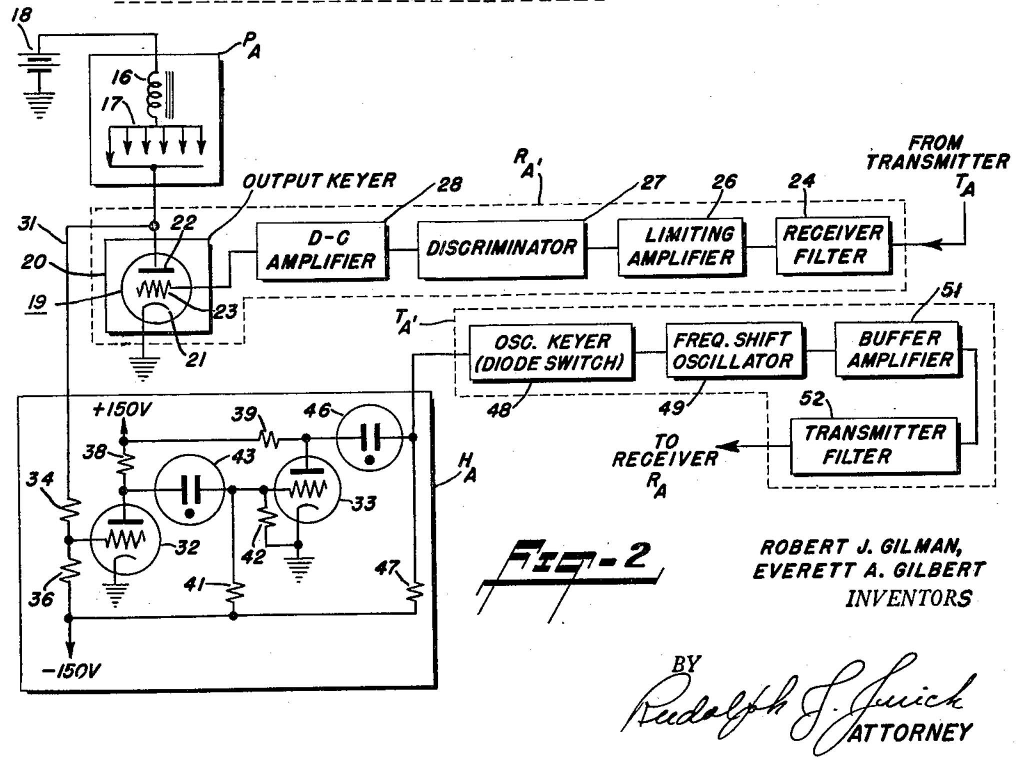
FIGURE 2 is a block diagram of a remote station of the type suitable for use in a telegraph system employing our novel multiple D.-C. repeater, with portions thereof shown in schematic circuit form.

Since the operation of the teleprinter system illustrated in block diagram form in FIGURE 1 obviously depends upon the remote stations included therein, a somewhat more detailed description of a typical remote station will be given below before an explanation of the operation of the system of FIGURE 1 is made. Reference is now, therefore, made to FIGURE 2 of the drawings wherein the remote station A, which is typical of the remote stations, is shown in greater detail than in FIGURE 1. It will be understood that although the detailed construction of the remote stations, per se, forms no part of our invention, the said stations are included in a telegraph system of which the multiple D.-C. repeater may form a part (it being further understood, however, that the said repeater is not limited to use in such system). In FIGURE 2, the remote station teleprinter $P_A$ is shown comprising a series connected printer selector magnet 16 and key contacts 17. The actual printers are of well-known conventional construction with the key contacts normally closed until a key is depressed, as in typing, or until such key is operated electromagnetically upon receiving transmitted intelligence. The selector magnet 16 and key contacts 17 are included in a D.C. teleprinter loop circuit which includes also a series connected source of D.-C. potential 18. The D.-C. teleprinter loop includes a keying tube 19 shown included in the output keyer 20 of the receiver $R_{A'}$, the cathode 21 and anode 22 of the keying tube being connected in series circuit in the loop. The grid 23 of the keying tube is normally biased with a positive (Mark) voltage so that the tube normally is conducting, as will be described hereinbelow. Consequently, the series circuit consisting of the tube 19, key contacts 17, selector magnet 16 and battery 18 normally is closed. The tube 19 is keyed and the printer is electronically operated by the output from the receiver $R_{A'}$ upon receipt of input signals to the said receiver.

The receiver, which may be of conventional design, comprises a receiver band pass filter 24 tuned to the same carrier frequency channel as the carrier from the transmitter $T_A$. The carrier comprises, preferably, a tone in the audio range wherein, by way of example, the Mark function can be represented by a 977.5 cycle per second tone and the Space function by a 892.5 cycle per second tone. The filtered Mark and Space signals from the communication link which pass through the receiver band pass filter are applied to a limiting amplifier 26 which may be of conventional design and utilizing, for example, several resistance-capacitance coupled stages, each operating as a limiting amplifier stage. The limited signals are then applied to a tuned discriminator 27 which may be of conventional design and which functions to convert the Mark signals to positive D.-C. voltages and the Space signals to negative D.-C. voltages, for example. The D.-C. signals are applied through a D.-C. amplifier 28 to the grid 23 of the output keyer tube 19. With a positive D.-C. voltage (Mark signal) from the amplifier 28, saturation plate current flows in the keyer tube 19. With a negative D.-C. voltage (Space signal) from the amplifier 28 the keyer tube 19 is cut off. Essentially, the tube 19 acts as an on-off switch in series with the teleprinter $P_A$ and supply battery 18.

The transmitter $T_{A'}$ is keyed by telegraph signal voltage pulses from the D.-C. telegraph loop circuit connected thereto through the D.-C. hybrid circuit $H_A$. As seen in FIGURE 2, the junction between the contact keys 17 and anode 22 of the tube 19 is connected through a lead wire 31 to the D.-C. hybrid $H_A$, which includes two stages comprising triode tubes 32 and 33. The lead 31 is connected through a resistor 34 to the grid of the tube 32. A fixed negative bias voltage is also applied to such grid from a negative 150 volt regulated supply and a resistor 36. Plate voltage for the anodes of the tubes 32 and 33 is provided from a positive 150 volt regulated plate supply through plate load resistors 38 and 39, respectively. The grid of the tube 33 has a fixed negative bias supplied by the negative 150 volt source through a resistor 41 included in a voltage diode network comprising also the resistor 42. Coupling between the anode of the tube 32 and grid of the tube 33 is by means of a type NE17 neon tube 43. When the positive signal from the battery 18 to the grid of the tube 32 is removed by opening the key contacts 17, the fixed negative bias thereon is sufficient to cut off the flow of plate current. Under such condition, the plate voltage of the tube will be of a level high enough to cause the neon tube 43 to ignite. The resistors 38 and 41 will act as a voltage divider between the plate supply voltage and the negative bias supply so that the grid of the tube 33 is driven by a positive voltage which will, of course, produce zero voltage at the grid of the tube 33 due to the flow of grid current. Under this condition, maximum plate current will flow in tube 33. On the other hand, with the key contacts 17 closed (Mark condition) the positive battery voltage from battery 18 will exceed the fixed negative bias applied to the grid of the tube 32 causing a maximum plate current flow thereby dropping the plate voltage to a level which will cause the neon tube 43 to be extinguished. This will open the voltage divider comprising the resistors 38, 41 and neon tube 43 so that the grid of the tube 33 will receive the full negative bias voltage which is sufficient in magnitude to cause plate current cut off in the tube 33. The resistor 39 serves as a plate load and also is part of a voltage divider comprising the neon tube 46, also type NE17, and the resistor 47. The voltage divider is also connected between the plate voltage supply and the negative bias supply. The neon tube 46 couples the plate of the tube 33 to the oscillator keyer 48 (comprising a diode switch or clamping circuit, for example) in the transmitter $T_{A'}$. The operation of the tube 33 is similar to that of the tube 32 whereby the normal phase reversal will result in a positive voltage being applied to the oscillator keyer 48 when the key contacts are closed.

The oscillator keyer 48 is connected to a frequency shift oscillator 49. The output from the frequency shift oscillator comprises a Mark signal tone of one frequency when the output from the D.-C. hybrid circuit $H_A$ is a positive voltage, and a Space signal tone of a second frequency when the teleprinter key contacts 17 open the D.-C. telegraph loop, and the output from the hybrid is a negative voltage. The oscillator output is connected through a buffer amplifier 51 and band pass filter 52 to the communication link extending to the receiver $R_A$.

It will be understood that when the printer loop is keyed by the tube 19, the resultant pulses coupled to the D.-C. hybrid through the lead wire 31 are sufficiently positive, regardless of the state of conduction of the tube 19, to provide a positive voltage to the grid of the tube 32 in excess of the fixed negative voltage applied thereto, to cause the tube 32 to conduct. It will be seen, then, that when the key contacts 17 are not being manipulated a positive Mark signal is applied to the transmitter oscillator keyer 48 whether the receiver amplifier 28 is putting out either a Mark or Space signal, to thereby hold the transmitter in Mark condition.

With the above brief description of a remote station, a general description of the operation of the system of FIGURE 1 is possible when it is further understood that the D.-C. teleprinter loop at the local station (and also that of the repeater at the intermediate station D) presents to the "or" circuits $X_A$—$X_D$ and $X_L$ a transmitter, receiver and D.-C. hybrid combination which is the equivalent of each of the remote channels terminations connected to the multiple D.-C. repeater 10. Referring, then, again to FIGURE 1, it will be recalled that the blocks $X_A$—$X_D$ and $X_L$ were described as being identical "or" circuits such that if the D.-C. inputs, designated *a*, *b*, *c*, *d* and *l*, are in a Mark condition, the output is a D.-C. Mark signal, and if any one of the inputs is a Space signal, the output therefrom is a Space signal. Therefore, in operation, if no message is being transmitted, each transmitter produces a Mark signal and all the printers will go to a Mark condition, locking the circuit into a Mark-Hold condition.

Upon keyboard operation of any teleprinter, such as for example, printer $P_A$ at station A, a frequency shifted Space signal is sent from the transmitter $T_{A'}$ to the associated receiver $R_A$ at the local station; the output "*a*" from the said receiver now being a D.-C. Space signal. The D.-C. Space signal "*a*" is fed to the blocks marked $X_B$, $X_C$, $X_D$ and $X_L$, but not to the block marked $X_A$, whereby the output from $X_B$, $X_C$, $X_D$ and $X_L$ now comprises a D.-C. Space signal while the output from $X_A$ remains a D.-C. Mark signal. The said Space signal from the receiver $R_A$ is thereby fed through the blocks $X_B$, $X_C$, $X_D$ and $X_L$ to the respective transmitters $T_B$, $T_C$, $T_D$ and $T_L$, but not to its associated transmitter $T_A$. The frequency shifted Space signals from the transmitter $T_B$ and $T_C$ are sent over suitable communication links to the receivers $R_{B'}$ and $R_{C'}$, respectively. which space signals break the D.-C. teleprinter loop of the printers $P_B$ and $P_C$ to provide printing operation of such printers. The frequency shifted Space signal from the transmitter $T_D$ is sent over a link to the intermediate station D and thence to the remote station E to provide printing operation of the printers $P_D$ and $P_E$, and since the repeater at the intermediate station D functions in the same manner as the repeater 10, the Space signal is not returned to the receiver $R_D$. The D.-C. Space signal to the local transmitter $T_L$ serves to break the local D.-C. teleprinter loop of the printer $P_L$ for printing operation of the said local printer.

Since the Space signal from the receiver $R_A$ is not fed to the block $X_A$, the output from $X_A$ remains a Mark signal. The resultant Mark signal from the transmitter $T_A$ serves to lock the receiver $R_{A'}$ in a Mark-Hold condition. If, for any reason, any station desires to break the message being sent by station A, they may do so by sending a series of Space signals which will be sent through the block $X_A$, transmitter $T_A$ and receiver $R_{A'}$ to break the D.-C. printer loop of the sending station A thereby indicating to the sending station the desire of the breaking station to transmit.

Figure 3:
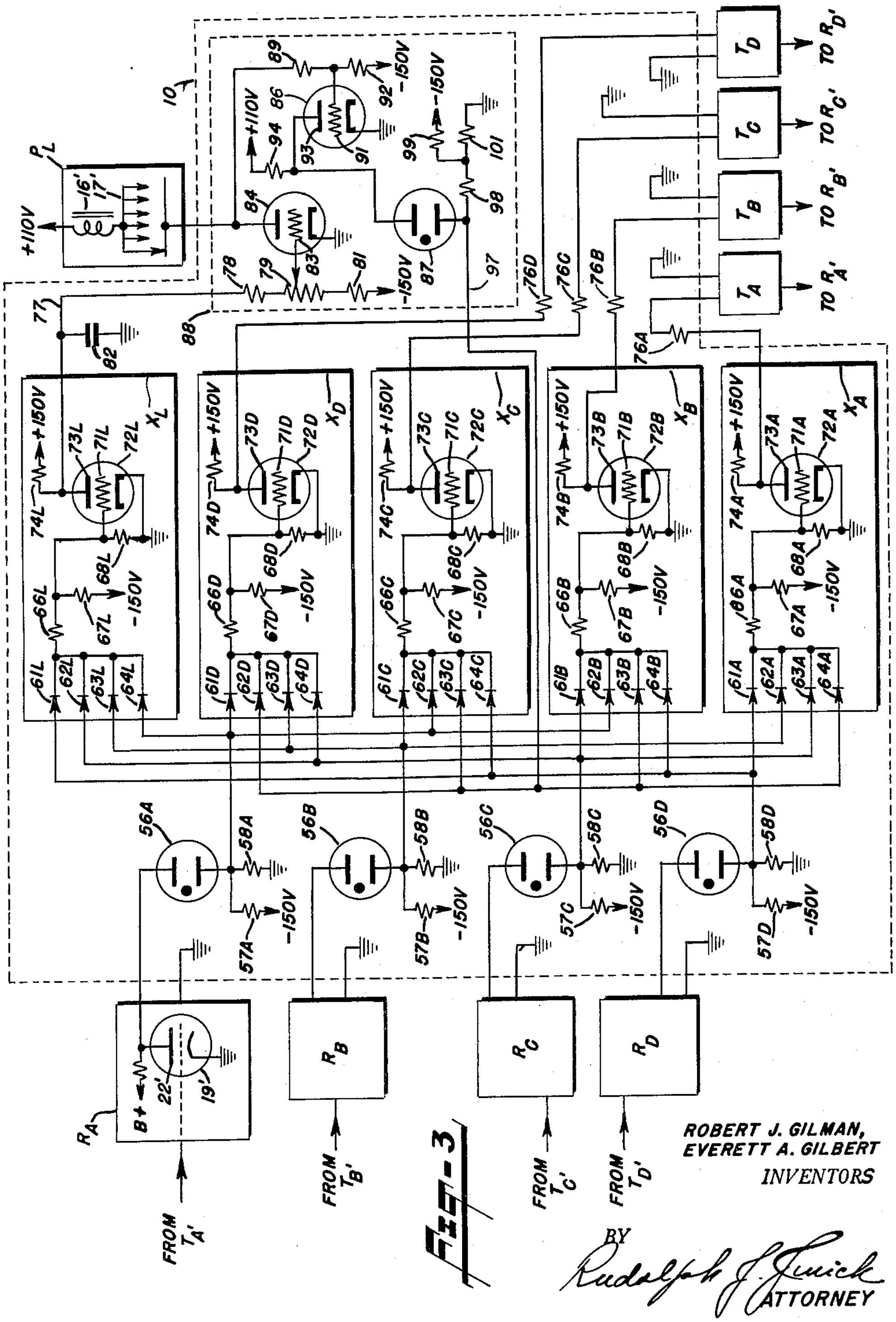
FIGURE 3 is a schematic circuit diagram of the novel multiple D.-C. repeater of our invention.

Reference is now made to FIGURE 3 of the drawings wherein there is shown a detailed schematic circuit diagram of our novel multiple D.-C. repeater 10 which includes the "or" circuits $X_L$ and $X_A$—$X_D$. Since all of the circuits $X_L$ and $X_A$—$X_D$ are identical, only the one circuit $X_L$ will be described in detail. Further, the input circuit components for the "or" circuits $X_A$—$X_D$ from the respective receivers $R_A$—$R_D$ are identical and, therefore, only the input circuit from the receiver $R_A$ is described in detail. The output from the receiver $R_A$ is shown obtained from the anode 22' of the receiver output tube 19'. Under the Mark condition the receiver output tube 19' is conducting whereby the output voltage therefrom to the repeater 10 is low, and under Space condition the said tube is cut off whereby the output voltage therefrom is at a maximum. The anode 22' of the receiver output tube 19' is connected through a neon tube 56A to the junction between a pair of series connected resistors 57A and 58A comprising a voltage divider network connected between a negative 150 volt supply and the common ground.

The "or" circuit $X_L$ includes a plurality of diodes 61L, 62L, 63L and 64L (the number of diodes included in each of the said "or" circuits being one less than the total number of channels associated with the repeater). The inputs to the respective diodes 61L, 62L, 63L and 64L in the local "or" circuit $X_L$ are derived from the receivers $R_D$, $R_C$, $R_B$ and $R_A$, it being noted that no other inputs are supplied thereto. The cathode terminals of diodes 61L, 62L, 63L and 64L are connected together and through a current limiting resistor 66L to the junction between a pair of series connected resistors 67L and 68L comprising a voltage divider network connected between a negative 150 volt supply and the common ground.

In the Mark, or current-on, condition of the output tube 19' of the receiver $R_A$, the anode 22' voltage is too low to fire neon tube 56A. The resistance values of the voltage divider resistors 57A and 58A are selected to provide a negative 25 volts, approximately, to the junction therebetween when the neon tube 56A is extinguished, which 25 volt negative potential is applied to the anodes of the diodes 62B, 62C, 61D and 64L. The resistance values of the voltage divider resistors 67L and 68L are selected to provide a negative 15 volts, approximately, to the cathodes of the diodes 61L—64L. Under such conditions, the diodes act as an open circuit and no signal is passed therethrough. The negative 15 volts is applied to the grid 71L of a tube 72L; the said tube being included in the circuit only for purposes of amplification, isolation, and phase reversal. The negative 15 volts is sufficient to cut the tube off. The anode 73L is connected to a positive 150 volt source through a plate load resistor 74L, and when the tube is cut off, the anode thereof approaches positive 150 volt potential. The output from the circuits $X_A$—$X_D$ are obtained from the anodes 73A—73D thereof and applied to the transmitters $T_A$—$T_D$ through current limiting resistors 76A—76D, respectively, to key the said transmitters. The said transmitters $T_A$—$T_D$ are keyed to a Mark condition when the tubes 72A—72D are cut off and the anode voltage is a maximum.

The output from the local "or" circuit $X_L$ is taken from the anode 73L of the tube 72L and connected through a lead wire 77 to a series connected resistor 78, potentiometer 79 and resistor 81 which, together with the plate load resistor 74L, comprises a voltage divider network between positive and negative 150 volt supplies. A shunt-connected capacitor 82 is connected between the anode 73L and the common ground potential for wave-shaping purposes.

The movable arm of the potentiometer 79 is connected to the control grid 83 of an output keying tube 84, the cathode of which is connected to ground and the anode of which is connected through the teleprinter $P_L$ to a positive 110 volt source of regulated supply; the series connected printer selector magnet 16', key contacts 17', keying tube 84 and positive supply potential comprising the local telegraph D.-C. loop. It will be understood that the potentiometer 79 is adjusted whereby a positive bias is applied to the keying tube 84 for the maximum conduction thereof when the amplifier tube 72L is cut off and the anode 73L is at a maximum positive potential; the keying tube 84 being cut off when the amplifier tube 72L is switched to a state of plate saturation. When the keying tube 84 is conducting, the local teleprinter loop is closed and in condition to respond to a Space signal, and when the keying tube 84 is cut off, the local D.-C. loop is opened.

The output keying tube 84, together with a tube 86, a gas discharge, or neon tube 87, and associated circuitry comprise the local transmitter $T_L$, receiver $R_L$ and hybrid $H_L$ combination, which combination is designated 88 in the drawings. The junction between the anode of the keying tube 84 and the teleprinter contact keys 17' is connected through a resistor 89 to the grid 91 of the tube 86. A fixed, negative bias voltage is also applied to such grid from a negative 150 volt regulated supply and a resistor 92. The cathode of the tube is grounded and the anode 93 is connected to a positive 110 volt supply through a plate load resistor 94. The anode 93 is coupled through the neon tube 87 and a lead wire 97 to the diodes 64A, 63B, 63C and 62D of the "or" circuits $X_A$—$X_D$, respectively. The lead wire 97 is connected through a current limiting resistor 98 to the junction between a pair of series connected resistors 99 and 101 comprising a voltage dividing network connected between a negative 150 volt supply and the common ground potential. The relative values of the voltage divider resistors 98 and 101 are such that a negative 25 volt potential, approximately, is applied to the anodes of the diodes 64A, 63B, 63C and 62D when the neon tube 87 is extinguished. Since the cathodes of such diodes are biased by a negative 15 volts, approximately, diodes are nonconducting under the above conditions.

It will be understood that when the local printer loop is keyed by the tube 84, the resultant pulses coupled to the grid 91 of the tube 86 (which tube and associated circuitry comprises a D.-C. hybrid) are sufficiently positive, regardless of the state of conduction of the tube 84, to provide a positive voltage to the grid 91 of the tube 86 in excess of the fixed negative voltage applied thereto, to thereby cause the tube 86 to conduct. With the tube conducting, a maximum plate current flow is produced thereby causing the neon tube 87 to be extinguished. Thus, at all times that the key contacts 17' are closed, the tube 86 conducts, the neon tube 87 is extinguished, and the negative 25 volts, approximately, is applied to the lead wire 97. When the positive signal from the 110 volt source through the selector magnet 16' and key contacts 17' to the grid 91 of the tube 86 is removed by opening the key contacts 17', the fixed negative bias thereon is sufficient to cut off the flow of plate current. Under such condition, the plate voltage of the tube 86 will be of a level high enough to cause the neon tube 87 to ignite. The neon tube thereby couples the anode 93 of the tube 86 to the lead wire 97 and thence to the diodes 64A, 63B, 63C and 62D whereupon the diodes will conduct.

A detailed description of the operation of the novel multiple D.-C. repeater circuit of FIGURE 3 will now be given. Under stand-by conditions, when none of the key board contacts at the remote stations are being actuated, a Mark signal is sent to the receivers $R_A$—$R_D$ whereby the receiver outputs comprise a minimum potential since the receiver keying tubes are operating under plate current saturation condition. The D.-C. hybrid tube 86 also operates under plate saturation condition when the key contacts of the local printer $P_L$ are closed under Mark conditions whereby the output therefrom is also at a minimum potential. None of the neon tubes 56A—56D and 87 conducts whereby the inputs to the diodes of the "or" circuits $X_A$—$X_D$ and $X_L$ is sufficiently negative to prevent conduction of said diodes. The input to the grids 71A—71D and 71L is thereby sufficiently negative to cut off the tubes 72A—72D and 72L. With the tubes 72A—72D cut off, a maximum positive keying potential is applied to the transmitters $T_A$—$T_D$ to hold the transmitters in a Mark condition whereupon the remote teleprinter D.-C. loops are maintained in a closed condition. The maximum positive potential to the grid of the tube 84 from the local "or" circuit $X_L$ serves to cause the tube 84 to conduct thereby closing the local teleprinter loop. It will be seen, then, that the normal output of the "or" circuits of the multiple D.-C. repeater functions to hold the system in a Mark-Hold position. It will be further noted that the removal of a receiver input from the receivers $R_A$—$R_D$ or a transmitter output connection to the transmitters $T_A$—$T_D$ will not disturb the normal condition. Thus, one or more of the terminals for the channels may be omitted from the system and the repeater will function properly for the remaining channels without the necessity of making further connections. Upon key board operation of any of the teleprinters, such as the remote teleprinter $P_A$ at station A, the output of the transmitter $T_{A'}$ is shifted from a Mark signal frequency to a Space signal frequency, which signal, in turn, keys the receiver $R_A$ into space condition whereupon the receiver output current is cut off and the voltage to the repeater approaches B+. The neon tube 56A will ignite and approximately +20 volts will appear at the anodes of diodes 64L, 61D, 62C and 62B in the circuits $X_L$, $X_D$, $X_C$, and $X_B$. Under these conditions, the said diodes become effectively short circuits and will pass the positive potential through the limiting resistors 66L, 66D, 66C and 66B to the grids 71L, 71D, 71C, and 71B of the tubes 72L, 72D, 72C and 72B causing heavy conduction thereof. The anode voltage of the conducting tubes will drop, thereby keying the transmitters $T_D$, $T_C$, and $T_B$, and the local transmitter comprising the tube 84, into Space condition. It will be seen, then, that a Space signal output from the receivers $R_A$ keys every transmitter except the transmitter $T_A$.

The tube 86 operates as a D.-C. hybrid. As long as the anode of the keying tube 84 is connected to the 110 volt source through the local teleprinter $P_L$, the tube 86 conducts, since the grid 91 thereof is also connected to such anode. The potential at the anode 93 of the tube 86 remains sufficiently low during conduction thereof to extinguish the neon tube 87. A negative bias is thereby applied through the lead wire 97, to the anodes of the diodes 64A, 63B, 63C and 62D to keep the diodes cut off so long as the printer $P_L$ is in Mark condition wherein the key contacts 17' are closed. When the key contacts 17' are opened and closed alternately as when sending a message, the tube 86 will cut off and conduct, respectively, and will ignite and extinguish the neon tube 87. From this point, the circuit operation is similar to the above description of operation wherein a remote station teleprinter is keyed.

An important operational feature of our novel multiple D.-C. repeater, essential to "break-in facilities" resides in the fact that the telegraph signal does not feed back into the same channel from which it came. It can be seen, then, that while one channel is sending, its return signal will be a Mark, or current On condition, since its input signal is conducted through the "or" circuits to each output circuit except the one associated with it, thereby maintaining the "break-in feature" since the other channels are capable of sending to the said sending channel. For example, if station B desires to break in while station A is sending, the operator at station B need merely actuate the teleprinter to thereby transmit a series of Space pulses. The signals from station B will be sent to the local station and remote stations A, C and D. The resultant disruption of copy at the station A indicates to the operator that someone in the system desires to transmit.

It will here be pointed out that there is no theoretical limit to the number of channels which can be accommodated by a multiple D.-C. repeater of our invention. There are, however, practical limits which include—(1), each channel draws power from the incoming receiver for the switching action of the diodes in the "or" circuits. The power that can be drawn is limited by the capabilities of such receivers, and where the repeater is utilized with existing receivers, the power output of such receivers is a predetermined maximum. (2), upon inspection of the repeater circuit, it will become apparent that the number of diodes necessary is equal to the product of the number of channels and the number of channels less one. For example, three channels require six diodes (3×2), four channels require 12 diodes (4×3), five channels require 20 diodes (5×4), six channels require 30 diodes (6×5), etc. Thus, each time a channel is added, the receiver must switch an additional diode, which requires additional power from the receiver.

As mentioned above, various uses in addition to that shown, exist for the repeater of our invention, which uses include connecting the repeater as a junction between printers alone to eliminate the necessity for connecting the printers in series circuit.

Deterioration of the telegraph signals at the repeater is negligible, primarily, because the repeater is an all electronic device utilizing no relays. Since no relays are used, the high cost of maintaining relays is eliminated. Since the repeater operates on a D.-C. basis, the communication link frequencies may be of any desired frequency, and may be different at different channels. The repeater may be used on channels operating on a frequency modulation basis (as illustrated) wherein a signal is sent for both Mark and Space conditions, as well as for a Mark-Hold function. The advantages of such a system over on-off type systems, for example, have been mentioned above.

Having now described our invention in detail, in accordance with the requirements of the Patent Statutes, various changes and modifications will suggest themselves to those skilled in this art. For example, circuits including a substitute connection for the neon tubes 56A—56D may be used to couple the receiver outputs to the "or" circuits in place of the neon tubes 56A—56D. In addition to the coupling function, the neon tubes may be used for indicators also, to indciate when and which channel is sending since the tube is alternately ignited and extinguished during sending operation. Further, the amplifying tubes 72A—72D and 72L which are used for amplification, isolation and phase reversal, are not essential to the operation of the repeater since other means are available for such purposes, or the following circuitry could be altered to receive a drive signal directly from the said diodes rather than through the amplifying tubes. It is intended that these and other changes and modifications shall fall within the spirit and scope of the invention as recited in the following claims.

We claim:

1. A repeater for use as a junction between a plurality of telegraph terminals each of which includes a receiver and transmitter, the said repeater comprising a plurality of "or" circuits each of which is responsive to each of the receiver outputs except one, each of the said transmitters being responsive to an individual "or" circuit whereby the receiver output of each receiver is sent to every transmitter except its associated terminal transmitter.

2. The invention as recited in claim 1 wherein each of the said "or" circuits compirses a plurality of similarly sensed diodes going from the input to the output of the "or" circuits and connected to receive the individual receiver outputs, the said transmitters being responsive to the output from each diode in an individual "or" circuit.

3. The invention as recited in claim 2 wherein the receiver outputs are connected to the individual diode anodes, the cathodes of the diodes of each "or" circuit being connected together and to the associated transmitter to key the same, and means normally biasing the diodes to a non-conducting state.

4. In a telegraph system, a plurality of remote stations each of which includes a terminal, a local station including a plurality of terminals, each of the said terminals including a transmitter and associated receiver, communication links connecting the remote station terminals to the local station terminals, a multiple D.-C. repeater comprising a plurality of "or" circuits at the local station, each "or" circuit being responsive to all except one of the local terminal receivers, the local terminal transmitters being responsive to the output from individual "or" circuits whereby each local terminal transmitter is responsive to the output from every local terminal receiver except its associated local terminal receiver.

5. The invention as recited in claim 4 wherein each of the "or" circuits comprises a plurality of similarly sensed diodes going from the input to the output circuits of the "or" circuits, each diode receiving a single input signal from the local terminal receivers, the diodes of each "or" circuit being connected together to the local terminal transmitters for keying purposes.

6. In a telegraph system, a plurality of remote stations each of which includes a terminal, a local station including a plurality of terminals, each of the said terminals including a transmitter and associated receiver, duplex communication links connecting the remote station terminals to the local station terminals, means normally keying the remote station terminal transmitters to Mark condition whereby the local terminal receiver connected thereto normally has a Mark signal output, a multiple D.-C. repeater including a plurality of "or" circuits each of which includes a plurality of input circuits and a single output circuit, means connecting the local terminal receiver output to an input circuit of every "or" circuit but one, means connecting the "or" circuit output circuits to individual local terminal transmitters to key the same whereby the said transmitters are keyed by signals from every local terminal receiver except its associated local terminal receiver.

7. In a telegraph system, a repeater comprising a plurality of "or" circuits; a local telegraph loop comprising a series connected teleprinter including keying contacts, a source of D.-C. potential and a keying member; the said keying member being responsive to the output from one of the said "or" circuits; a D.-C. hybrid member connected to the junction between the series connected teleprinter and keying member and responsive only to operation of the said teleprinter keying contacts; a gas discharge tube; the output from the said hybrid member being connected through the said gas discharge tube to every "or" circuit except the "or" circuit having an output connected to the said keying member.

8. The invention as recited in claim 7 including a plurality of telegraph terminals each of which includes a receiver and associated transmitter, the output from each receiver being connected to every "or" circuit except one, each of the said transmitters being responsive to an individual "or" circuit whereby each of the receiver outputs is coupled to every transmitter except its associated transmitter.

9. The invention as recited in claim 8 wherein the repeater includes one more "or" circuit than the number of telegraph terminals therein, and each "or" circuit comprising diodes equal in number to the number of telegraph terminals therein.

10. The invention as recited in claim 8 wherein the said "or" circuits comprise a network of diodes.

References Cited in the file of this patent

UNITED STATES PATENTS 2,690,476 Rea ------------------ Sept. 28, 1954
2,910,584 Steele ---------------- Oct. 27, 1959